Nov. 10, 1931.   H. WORKMAN   1,831,279
MOTOR CAR HEAD LAMP
Filed April 7, 1928   3 Sheets-Sheet 3
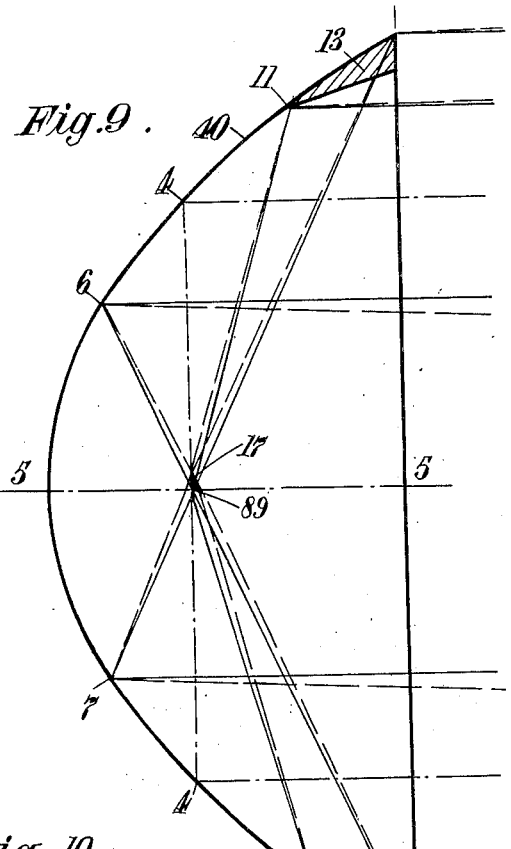
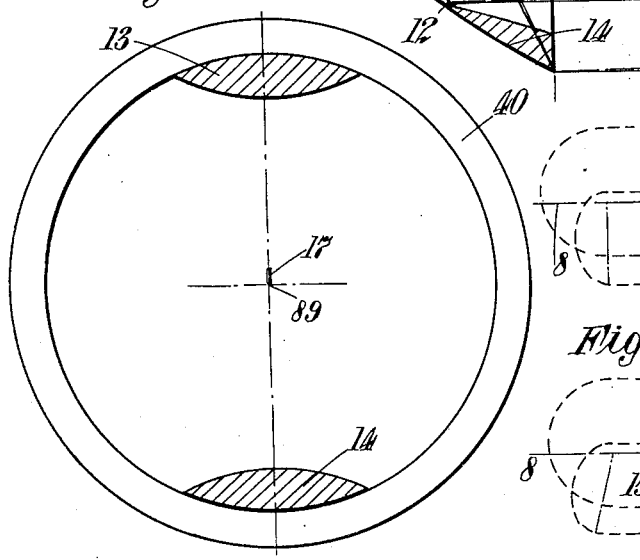
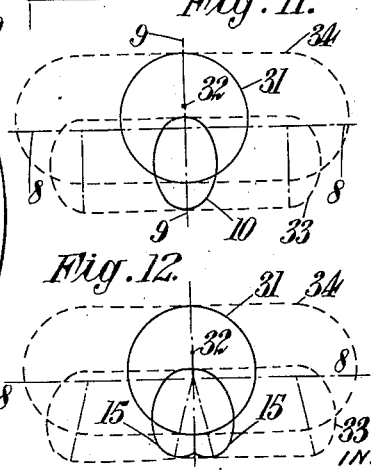
INVENTOR
Harold Workman
BY Gill & Jennings
ATTORNEYS.

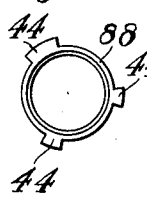# 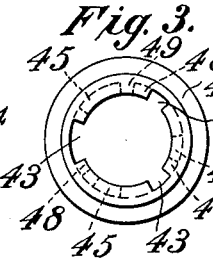 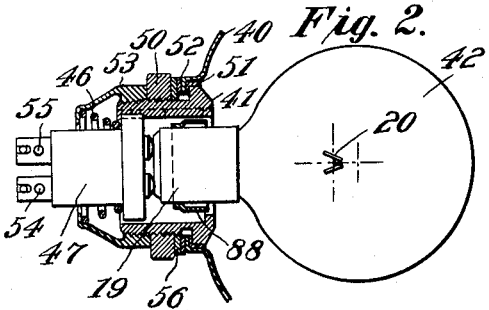 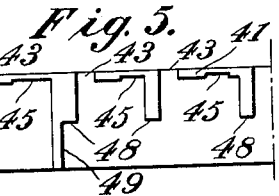 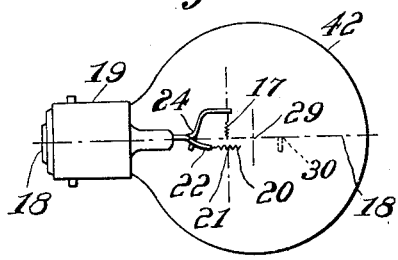 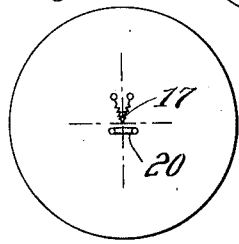 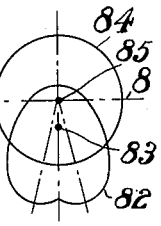 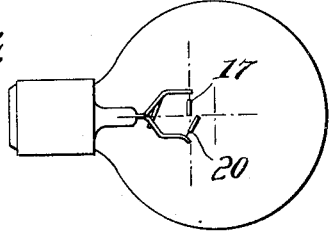 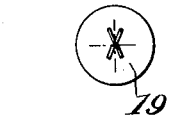 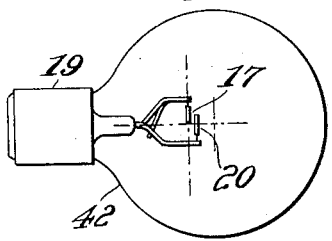 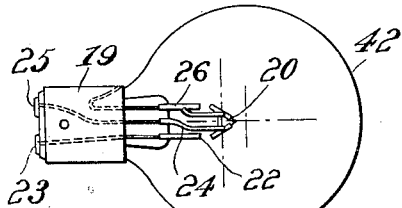 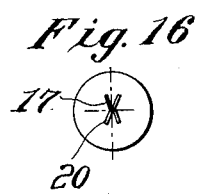 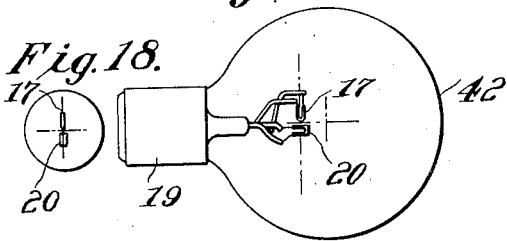

Patented Nov. 10, 1931

1,831,279

UNITED STATES PATENT OFFICE

HAROLD WORKMAN, OF GLASGOW, SCOTLAND

MOTOR CAR HEAD LAMP

Application filed April 7, 1928, Serial No. 268,388, and in Great Britain April 11, 1927.

This invention relates to motor head lamps of the class having a substantially parabolic reflector, and to electric incandescent bulbs for such lamps. The main object of the invention is to enable a downwardly directed beam, which preferably has a flat top, to be projected in such a way that the upper edge of the beam is directed along or slightly above the axis of the reflector of the lamp and the zone of maximum intensity of the beam is at or near to its upper edge; and secondly to provide a full driving beam when a second filament in the bulb is brought into action either alone or in conjunction with the filament producing the downwardly directed beam.

One object of the invention, therefore comprises a motor head lamp with a substantially parabolic reflector extending completely around the axis and forwardly of the focus thereof and a light source which is linear as seen from the side, is disposed in or very near to the plane containing the latus rectum of the generating parabola, extends upwards from the focus or a point very near thereto and is of narrow dimensions as seen from the front in that portion thereof near to the focus. Such a source of light provides the above mentioned downwardly directed beam.

Another object of the invention comprises such a motor head lamp with a second source of light, which itself may provide the main driving beam or which may provide the main driving beam in conjunction with the first-named source of light. This source is preferably a filament mounted slightly below and parallel to the axis of the reflector, but with its light centre near to the focus of the reflector.

Such an embodiment as already described will not fully attain the main purpose of the invention as the beam is of narrow spread, particularly at and just below the horizontal axial plane of the reflector. The invention, therefore, further consists in a motor head lamp of the parabolic reflector type with at least one filament in a bulb as already described, and with a front glass formed with vertical grooves or ribs in order to afford a wide spread, particularly of the depressed beam.

In order that the invention may be clearly understood and readily carried into effect, some forms of construction of lamp bulbs and complete lamps in accordance with the invention are illustrated in the accompanying drawings, which also include some explanatory diagrams illustrating the distribution of light obtained; in these drawings, Figure 1 is a central vertical section through a preferred form of the complete lamp, furnished with a device for giving sensitive tilting adjustment;

Figure 2 is a horizontal central section through the lamp holder showing details of the method of accurately focussing the bulb;

Figure 3 is a front elevation of the lamp holder;

Figure 4 is a front view of the adapter secured to the lamp cap;

Figure 5 is a development showing the internal recesses of the lamp holder;

Figures 6, 7 and 8 are side elevation, plan, and front elevation respectively of the bulb illustrated in Figure 1;

Figure 9 is a diagrammatic central vertical section in order to illustrate the distribution of light provided by a lamp according to the invention;

Figure 10 is a diagrammatic front elevation corresponding to Figure 9;

Figures 11 and 12 are diagrammatic sections of beams produced when V-filaments of various forms are employed extending upwards from the focus of the reflector;

Figure 1:
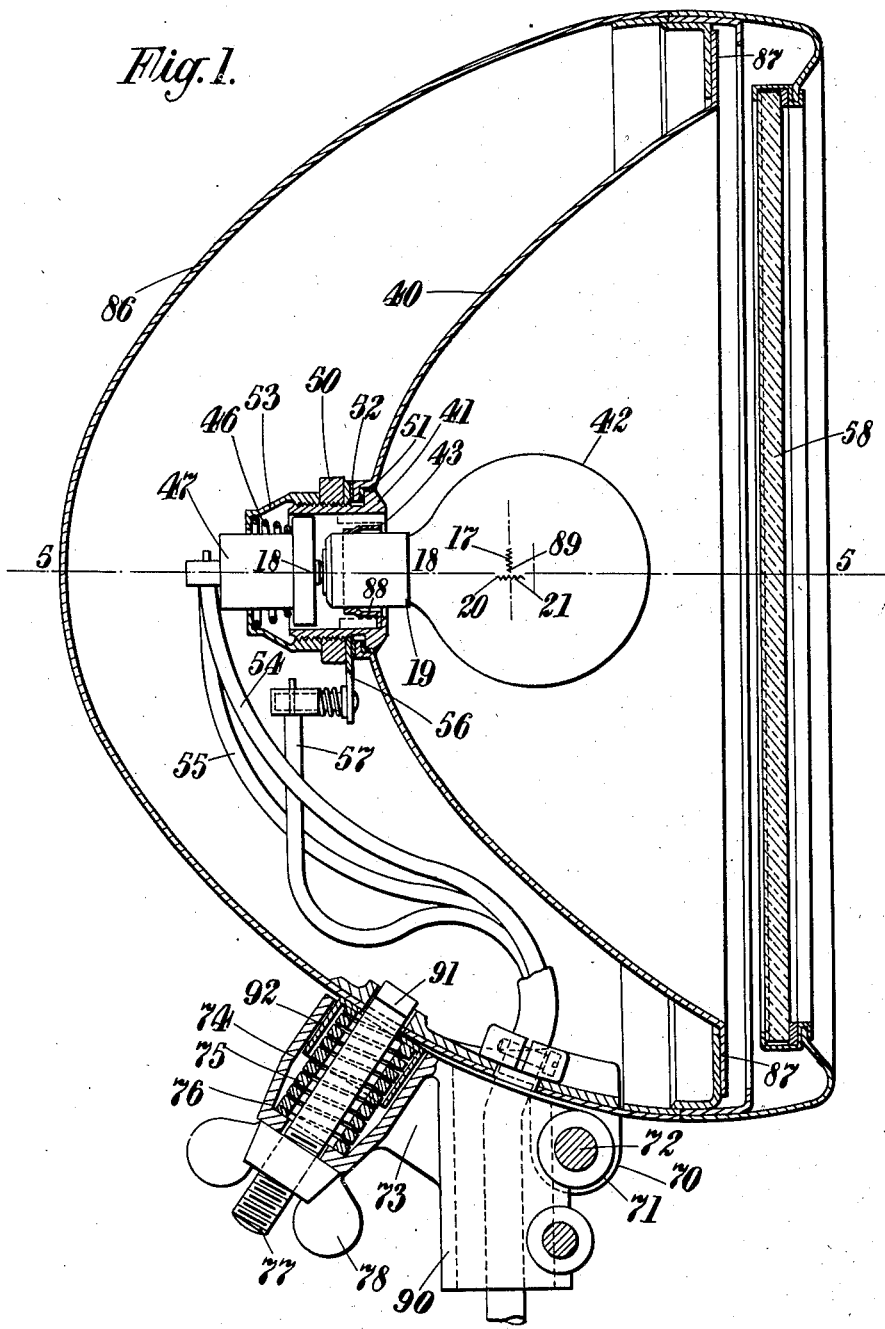

Figures 13 and 14, Figures 15 and 16 and Figures 17 and 18 taken in pairs are respectively side views and front views of bulbs showing modified arrangements of filaments which can be used in accordance with the present invention; and Figures 19 and 20 are views showing respectively the effect of having the apex of the V-filament slightly below and slightly above the focus of the reflector.

Referring first to Figures 1 to 8, the lamp body is shown at 86 and the paraboloidal reflector 40 is secured therein by its peripheral flange 87. The lamp holder is fixed in a central rear opening in the reflector 40, and, as seen particularly in Figures 1, 2, 3 and 4, it is formed with an internal flange with openings 43 through which the bayonet lugs 44 formed on a fitting piece or adapter 88 enter, and recesses 45 into which the lugs 44 are bedded and locked by the spring 46, which thrusts forward the contact plug 47, which in its turn holds the lamp bulb with the lugs in the recesses 45. There are three internal ribs 48, the rear ends of which act as stops to the forward movement of the contact plug 47 when the bulb has been removed from the holder, and the extension 49 of one of the ribs engages a slot in the flange of the plug 47 to maintain the latter in the correct angular position. The lamp holder 41 is securely held in the aperture in the back of the reflector 40 by a nut 50 and, as shown in Figures 1 and 2, is insulated from the reflector 40 by an insulating cup 51 and an insulating washer 52. The screw cap 53 holds the contact plug spring 46 in position, but allows a small rocking movement of the contact plug 47.

The bulb illustrated in Figures 1 and 6, 7 and 8 is a dual filament bulb and has a V-shaped filament 17 extending upwards from the axis 18, 18 of the bayonet cap 19, so that it may be focussed or adjusted so that it extends upwards from the focus 89 of the reflector 40 and lies in the transverse focal plane of the reflector. The filament 20 which provides the full beam is a horizontal V-shaped filament mounted with its light centre 21 slightly below the point of the filament 17. The leading-in wire 22 to the full beam filament 20 is connected to the rear contact 23, and the leading-in wire 24 for the depressed beam filament 17 is connected to the rear contact 25, the leading-out wire 26 common to both filaments being connected to the lamp cap 19. In Figures 6, 7 and 8, the bulb 42 is shown mounted in an ordinary standard bayonet cap and may be focussed or adjusted along the axis 5, 5 of the reflector 40 in the ordinary way, and also focussed at right angles to the axis of the reflector where such an adjustment is provided. In Figures 1 and 2, on the other hand, the lamp cap 19 is secured within a fitting piece or adapter 88 constructed in accordance with my United States Patent No. 1,640,867 dated August 30th, 1927.

The current flowing to the full beam filament 20 is conducted through the wire 54 and that to the depressed beam filament 17 through the wire 55, the wire 57 being the return conductor common to both filaments, the current passing from the lamp cap 19 into the body of the lamp holder 41 and through the washer plate 56. Clearly, the common return wire 57 may be omitted if desired and the common return currents passed through the chassis of the car to the accumulator, as is common practice with other forms of dual filament bulbs, in which case the body of the lamp cap 19 would be merely grounded to the frame of the lamp.

The glass bulbs 42 and 28, when intended for use with lamp holders mounted in the back of the reflectors or lamp bodies are preferably formed mainly as spheres about a centre 29 a short distance, say 5 millimetres, in front of the lower end of the depressed beam filament 17. The advantage of this formation is that the ghost image formed by the light rays reflected from the surfaces of the glass bulb back on to the reflector surface, and marked 30 in Figure 6, is situated well in front of the focus of the reflector so that such light is reflected at a wide angle from the axis of the reflector.

The filaments may be formed and mounted in accordance with the invention in any suitable or convenient manner, and as examples various forms and dispositions of filaments are illustrated in Figures 13 to 18.

In all of these cases the depressed beam filament 17 is meant to be adjusted to lie approximately in the transverse focal plane of the reflector 40 and to extend upwardly approximately from the focus 89 of the reflector. Figures 13 and 14, illustrate constructions in which the full driving beam is produced by both of the filaments 17 and 20 in operation together. Figures 15 and 16, and Figures 17 and 18 illustrate constructions such that the full driving beam is produced by the full beam filament 20 alone.

The depressed beam filament is an acute V-filament but satisfactory results may be obtained by the use of a double filler or U-filament, which is the limiting case of an acute V-filament. Also, the forms shown in Figures 17 and 18, in which one leg of the acute V-shaped filament lies in front of and the other behind the transverse focal plane 4, 4 of the reflector 40, and may be used satisfactorily for the purposes of the present invention, such forms of filaments can clearly easily be disposed approximately in the transverse focal plane of the reflector.

With regard to the accurate focussing of the bulbs before they are issued, the bulbs may be focussed in the bayonet caps which are cemented to them, or they may be focussed in bayonet adapters rigidly secured to the bulb cap after it has been cemented to the bulb. In either case the following adjustment should be made—first, the bulb must be set in the correct angular position around the axis in relation to the bayonet lugs so that the first filament extends upwards from the axis, secondly, two lateral adjustments across the axis at right angles to each other should be made to place the lower end of the first filament accurately upon the axis, and thirdly, a forward and backward adjustment along the axis should be made to place the lower end of the first filament at exactly the correct distance from the bayonet lugs so that it lies upon the focus of the reflector. In the case where the bulb is focussed in the bayonet cap cemented to it, this last adjustment is made by selecting a cap of correct length between the bayonet lugs and the forward end of the cap. Where a bayonet adapter is used this last adjustment is made by setting the adapter in the correct forward and backward position before fixing it to the bulb cap. In both cases the two lateral adjustments across the axis at right angles to each other may be made as angular rocking adjustments of the bulb in its cap or in the bayonet adapter attached to the cap. It is also desirable that the bulbs can only be inserted in the lamp holders in the correct angular position around the axis so that the depressed beam filament 17 must extend upwards from the focus 89, and this may be provided for in any suitable or convenient manner, such as by altering the shape or size of one of the lugs 44 or setting the lugs 44 in such angular positions around the cap 19 or adapter 88, that they can only be inserted in one way. In Figure 4, for example, the adapter 88 is shown with one lug 44 wider than the others, so that that lug can only enter the widest recess 43 in the lamp holder.

To assist in a clear understanding of the invention, it is based on the optical facts arising when a line light source is located to extend upwards from the focus of a paraboloidal reflector. In Figures 9, 10 and 11, the line light source 17 extends upwards from the focus 89 of the paraboloidal reflector 40. The resultant beam from the whole reflecting surface behind the transverse focal plane 4, 4 is roughly of vertical elliptical section projected along and below the axis of the reflector with its brightest portion along the axis and directly below it, the light rays from any point 6 above the axis and any point 7 below the axis being reflected as shown. If the line light source is replaced by a spiral coil filament, owing to the dimensions of the latter at the focus and slight disturbances due to other causes, the upper edge of the beam rises slightly above the axis, say at an angle of 9 inches in 100 feet, and its section is of the form 10 in Figure 11.

If the reflector 40 extends in front of the transverse focal plane 4, 4 in Figure 9, some rising light of relatively narrow angle of vertical spread is produced from small zones at the mouth of both the upper and lower halves of the reflector near to the vertical axial plane the angle of such rising light above the axis increasing with the relative depth of the reflector. Thus, for example, light projected from the point 11 in the upper half and from the point 12 in the lower half of the reflector may rise at an angle of say 9 inches in 100 feet, and rising light of a greater angle, up to say 18 inches in 100 feet, will be projected from the small zones 13 and 14 shown in Figures 9 and 10.

Such rising light may be cut out, scattered or directly downwards by suitable treatment or formation of these zones in the reflector or of the front glass in front of them, if desired, but this is hardly necessary as the amount of such rising light is very small.

When the light source is V-shaped and consists of two line light sources extending upwards from the focus 89 at the same angle on opposite sides of the vertical but in the transverse focal plane 4, 4 as in Figures 6 and 8, for example, the section of the resultant beam consists of two areas which are roughly elliptical, as indicated at 15, 15 in Figure 12.

In Figures 11 and 12, 31 is a section of the full beam produced by filament 20 in Figures 1, 2 and 6 to 8, the zone of maximum intensity being marked 32, and 33 shows the section of the depressed beam and 34 the section of the full beam when spread by a vertically grooved front glass such as is commonly used.

The effect of locating the lower end of the depressed beam filament 17 in the bulb 42 in Figures 1, 2 and 6 to 8, say 1 millimetre below the focus 89 of the reflector 40, is shown in Figure 19, as compared with the correct setting of the filament as shown in Figure 12. The effect is that the upper edge of the depressed beam shown in section 79 in Figure 19, rises at an increased angle of, say, 2 feet 9 inches in 100 feet above the axis level 8, 8, the depth below the axis level being reduced proportionately. The zone of maximum intensity of the depressed beam lies along the axis, and the light intensity along the upper edge of that beam is therefore not so good. The full beam is distorted upwards as shown in section 80, with its zone of maximum intensity at 81, and its penetration is somewhat lessened, owing to the increased distortion. Conversely the effect of locating the lower end of the depressed beam 17 say 1 millimetre above the focus 89 of the reflector 40 is shown in Figure 20. The upper edge of the depressed beam marked in section 82, rises at a slightly increased angle above the axis level 8, 8, the depth below the axis being increased by, say, 2 feet in 100 feet. The illumination along the upper edge is poor and the zone of maximum intensity is at point 83. The full beam filament 21 will lie along the axis and the full beam 84 will have its zone of maximum intensity at 85 on the axis level 8, 8, and will therefore be directed downwards instead of parallel to the roadway. It is clear, therefore, that while a little latitude is permissible in setting the lower end of the depressed beam filament 17 slightly below the axis 5, 5 of the reflector 40, it is undesirable that there should be any gap between its lower end and the axis of the reflector.

When a vertically grooved front glass is used to spread the beam laterally, the penetration of the full beam is of course reduced to some extent, depending on the amount of lateral spread desired. When so arranged, the angle between the legs of the V-filament which produces the depressed flat-topped beam is preferably made fairly acute, say 25° to 30°.

In cases where it is preferred to retain the maximum penetration of the full driving beam, a plain front glass may be used, and a depressed beam of moderate spread may be obtained by increasing the angle between the legs of the V-filament which produces it to say 90°. In such cases, the bulbs may be lightly frosted with the object of diffusing the light in the beams produced to a slight extent without materially affecting their form, or a similar effect may be produced by lightly etching the surface of the plain front glass.

If desired, the depressed beam may be directed downwardly and sideways. In this case the axis of the reflector is slightly downwardly and sideways directed and the depressed beam filament is mounted to extend upwardly and sideways approximately from the focus, and to lie approximately in the transverse focal plane of the reflector.

Referring to Figure 1, the lamp body 86 is formed with two lugs 70 which are in contact with the outer or end surfaces of a boss 71 formed at the top of a socket support or pillar 90, while a bolt 72 acting as a pivot passes through the lugs 70 and the boss 71. In order to make a fine tilting adjustment possible, a bolt 77 with a T-head 91 lying within the lamp body in a slot, which prevents the bolt 77 from turning, extends outwards and is surrounded by a coiled spring 75. At the inner end this spring is housed in a thimble 92, which is surrounded also by a deep casing 74, which is fixed and is connected to the pillar 90 by a web or arm 73. A wing nut 78 is screwed on to the bolt 77, and when tightened up, draws the T-bolt 77 with the lamp body 86 downwards, compressing the spring 75, and when loosened allows the spring 75 to expand, pressing the lamp body 86 upwards, thereby providing a sensitive adjustment of the lamp body about the pivot bolt 72.

The reflectors employed in the improved lamp need not be absolutely accurately formed to a parabolic shape as satisfactory results may be obtained with reflectors slightly departing from the true parabolic form and also with reflectors of approximately parabolic form wherein a lateral spreading effect is produced by forming shallow grooved vertical bands in the surface of the reflector.

I claim:

1. A motor head lamp comprising a substantially parabolic reflector extending completely around the axis forwardly of the focus thereof to an extent at least equal to the focal length of the reflector, and a light source which is linear as seen from the side, disposed approximately in the plane containing the latus rectum of the generating parabola, extends upwardly approximately from the focus of said reflector and is of narrow dimensions as seen from the front in that portion thereof near to said focus.

2. A motor headlamp comprising in combination a substantially parabolic reflector extending completely around the axis forwardly of the focus thereof to an extent at least equal to the focal length of the reflector, and an electric incandescent lamp having one filament which is linear as seen from the side, is disposed approximately in the plane containing the latus rectum of the generating parabola, extends upwardly approximately from the focus of said reflector and is of narrow dimensions as seen from the front at least in that portion thereof near to said focus, and a second filament disposed with its light centre near to said focus.

3. A motor headlamp comprising in combination a substantially parabolic reflector extending completely around the axis forwardly of the focus thereof to an extent at least equal to the focal length of the reflector, and an electric incandescent lamp having one filament which is linear as seen from the side, is disposed approximately in the plane containing the latus rectum of the generating parabola, extends upwardly approximately from the focus of said reflector and is of narrow dimensions as seen from the front at least in that portion thereof near to said focus, and a second filament disposed with its light centre slightly below the axis and near to said focus.

4. A motor headlamp comprising in combination a substantially parabolic reflector extending completely around the axis forwardly of the focus thereof to an extent at least equal to the focal length of the reflector, and an electric incandescent lamp having a V-shaped filament with its plane approximately coincident with the plane containing the latus rectum of the generating parabola and with its apex directed downwards and located approximately at the focus of the reflector.

In witness whereof I hereunto subscribe my name this 30th day of March, 1928.

HAROLD WORKMAN.